Oct. 4, 1966    A. BUSKE    3,276,676
BEARING INSTALLATION FOR ROTARY PISTON MACHINES
Filed Oct. 27, 1964    3 Sheets-Sheet 1
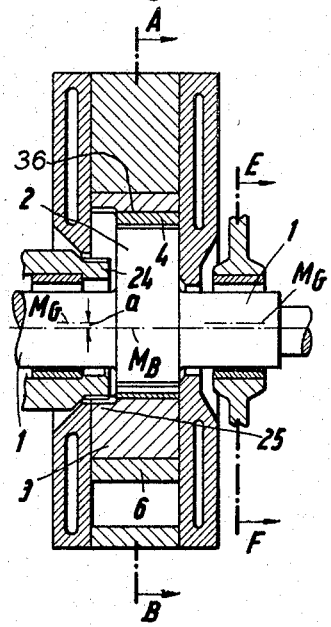
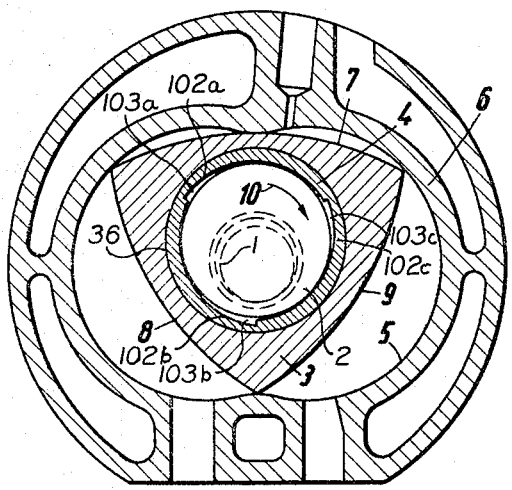
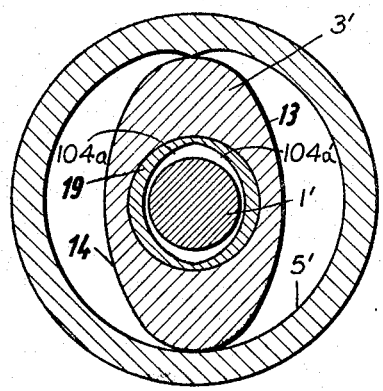
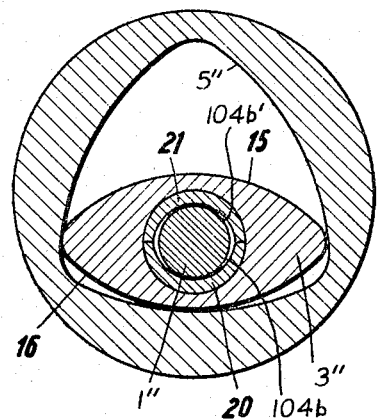
Inventor:
ALFRED BUSKE
BY Burgess, Dinklage
& Sprung
ATTORNEYS.

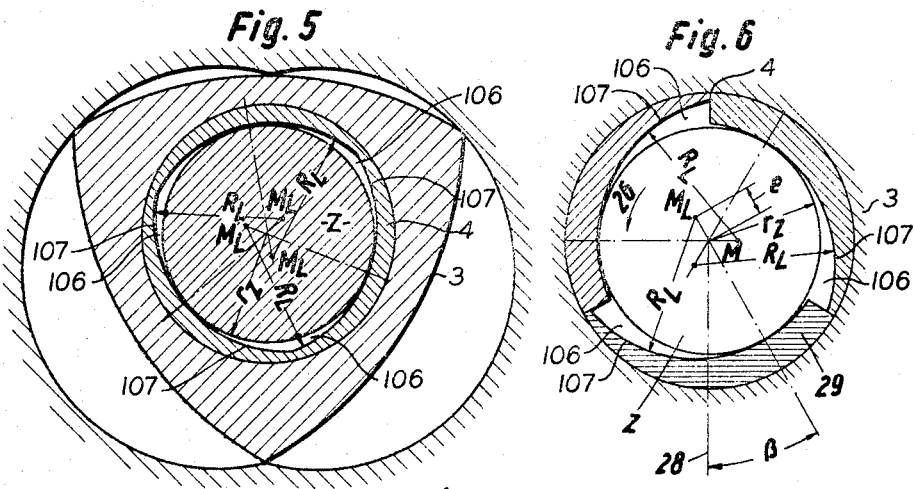
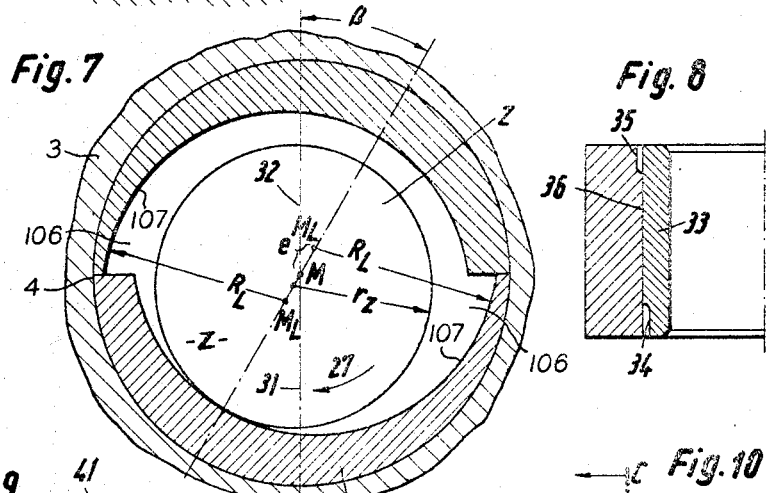
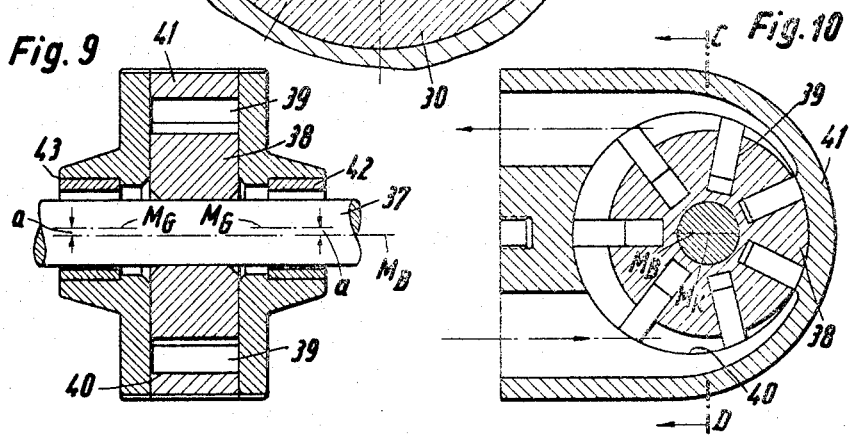

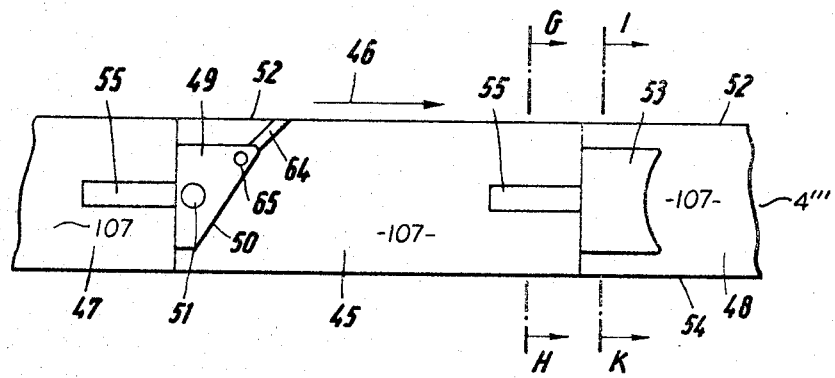
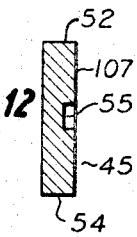
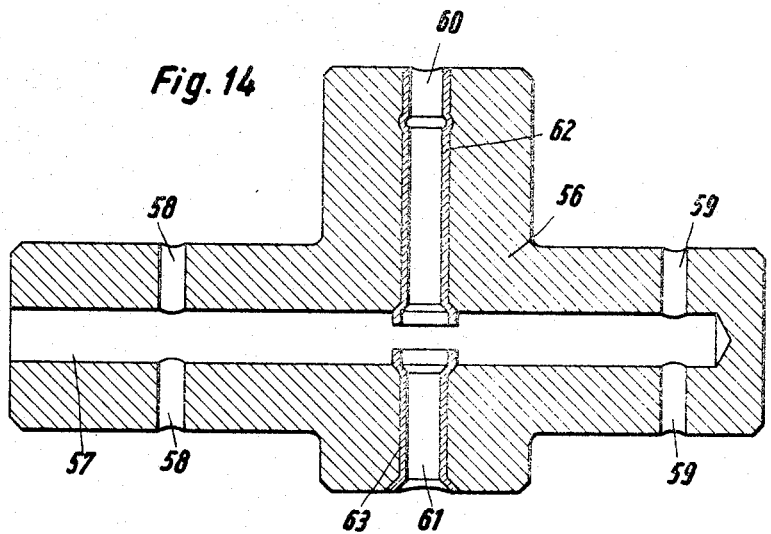

United States Patent Office 3,276,676
Patented Oct. 4, 1966

3,276,676
BEARING INSTALLATION FOR ROTARY
PISTON MACHINES
Alfred Buske, Neckarsulm, Germany, assignor to Karl Schmidt G.m.b.H., Neckarsulm, Germany, a corporation of Germany
Filed Oct. 27, 1964, Ser. No. 406,716
Claims priority, application Germany, Nov. 2, 1963, Sch 34,097
14 Claims. (Cl. 230—145)

This invention relates in general to improved journal bearing installations for the moving parts of rotary piston machines, and more particularly to an improved journal bearing construction for connecting journal members to rotary pistons in such machines.

In rotary piston machines of the prior art, such a for example, the "Wankel" motor and other pumps and motors, certain performance deficiences and problems resulted from the lack of sufficiently precise guidance of the moving parts by reason of the play in the conventional friction and roller bearings which were used. The rotary piston movements resulting from the bearing play result in disturbances, for example, in the seal between the pressure and suction chambers in pumps. Furthermore, due to the uncontrolled piston movements, damage is done, such as reduction in the life of the sealing elements, intolerably great wear, chatter marks on the sealing surfaces, and the deformation of the seal grooves. In the case of rotary piston machines in which the piston is additionally driven by a gearing having an appropriate transmission ratio, the summation of the play at the various bearings of the mechanism produces additional difficulties. To this are added inaccuracies due to the meshing of the gears, coupled with backlash, high wear and burdensome noise from these parts.

Attempts have been made to reduce bearing play. This has resulted, however, in bearing troubles due to seizing since, for reliable operation, bearings require a minimum clearance according to their speed, this clearance being the difference in the radii of curvature of the friction bearing surfaces that are cooperating with one another, to assure an optimum lubricant wedge angle, and not even roller bearings can operate satisfactorily without bearing clearance.

The present invention is aimed at the problem of eliminating the above-mentioned difficulties.

It has been found by experiment that, for the perfect and reliable operation of the sealing elements and the driving gears of rotary piston machines, the guidance of the piston on its associated eccentric has to be performed in a bearing differing in cross section from the circular shape, and having as many friction or guiding surfaces as the piston has external peripheral working surfaces. In such a bearing according to the invention, the compression and ignition forces working on the piston are taken up by the partial friction surface of the bearing, which lies underneath the working surface subject to the compression and combustion pressure, so that by this fact a quieter running of the moving parts is brought about. Furthermore, the bearing clearances can be decisively reduced. By this measure the silence of operation of the moving parts is additionally improved.

It has furthermore developed that, for the achievement of a tight and reliable bearing, it is advantageous if the center axes of the radii of the individual friction or guiding surfaces of a plurality of cooperating bearings or guides are displaced from one another in such a manner that the radii of the cooperating friction or guiding surfaces overlap one another. This is achieved by the fact that the center axes of the bearing holes for the guidance of the eccentric shaft in the casing are displaced outside of the center axis of the cylinder hole in the direction of the compression or combustion chamber. This displacement amounts approximately to the sum of the radial clearances of the housing bearings and of the bearing of the piston on the eccentric and, if desired, the radial play of the piston in its cylindrical or, for example, trochoidal guiding hole. In machines in which a great bending of the shaft takes place, it is expedient to include in this sum also the amount of the bending.

It is therefore, an object of the invention to provide a journal bearing for a rotary piston which will accommodate the varying load forces imposed on such a piston and will provide a sufficiently precise journal guidance that excessive bearing play is eliminated.

Another object of the invention is to provide a journal bearing for a cam shaped member similar in shape to the aforesaid rotary piston, and which experiences similar varying load forces, that will provide a sufficiently precise journal guidance that excessive bearing play is eliminated.

Another and further object of the invention is to provide a journal bearing as aforesaid which can be readily inserted into the bearing bore of such a piston or cam.

Still another object of the invention is to provide a more effective lubrication means for the aforesaid journal bearings.

Other objects and advantages of the invention will appear in, or become evident from the following detailed description of the embodiments of the invention, and the accompanying drawings wherein:

FIG. 1 is a longitudinal cross section through a typical rotary piston machine, commonly designated a Wankel motor, wherein an eccentric is journaled to the piston thereof by means of a bearing according to the invention.

FIG. 2 is a transverse section taken along the line A–B of FIG. 1, showing the shape of the rotary piston and the arrangement of the journal bearing guide surfaces.

FIG. 3 is a transverse section through another rotary piston machine which uses a piston having a peripheral working surface defined by a plurality of tangentially joined curved surface sections, and showing a typical journal bearing according to the invention.

FIG. 4 is a transverse section through still another rotary piston machine having a piston similar in shape to that of FIG. 3, but having a distinctively different piston guide bore and showing a typical journal bearing according to the invention.

FIG. 5 is a transverse section through a rotary piston machine similar in construction to that of FIG. 2, illustrating a journal bearing geometry which provides a plurality of wedge shaped lubricating gaps.

FIG. 6 is a transverse section through a journal bearing according to the invention which is assembled from three separable bearing shell sections.

FIG. 7 is a transverse section through another journal bearing similar to that shown in FIG. 6, but having two separable bearing shell segments.

FIG. 8 is a partial longitudinal section through a journal bearing and its associated piston bore, showing a modified bearing shell construction which facilitates the installation of the bearing in the bore.

FIG. 9 is a longitudinal cross section through a rotary piston machine taken along the line C–D of FIG. 10 wherein the eccentric is journalled to the piston by means of a bearing according to the invention and the eccentric shaft through the casing is journalled in the bearings which are offset in relation to the axis of the working cylinder.

FIG. 10 is a transverse cross section of the rotary piston machine of FIG. 9.

FIG. 11 is a developed view of a typical bearing surface formed by a plurality of adjacent bearing shells, illustrating an improved arrangement of lubricating passages and pockets.

FIG. 12 is a transverse section of the bearing of FIG. 11 taken along the line G–H.

FIG. 13 is another transverse section of the bearing of FIG. 11 taken along the line I–K.

FIG. 14 is a longitudinal section of an integrally conconstructed eccentric and its support shaft, showing a preferred arrangement of lubricating passages therein.

Referring now to FIG. 1, which shows a longitudinal section (i.e. normal to flat plate rotary piston) of a typical Wankel motor, a working shaft 1 is affixed to and rotates with an eccentric 2. A rotary piston 3 is journalled to the eccentric 2 by means of a bearing 4, which may be a bushing having suitable lubricating properties, said bearing 4 being inserted in a bore 36 provided in the piston 3 by means of a pressed fit, or any other suitable means whereby the bearing 4 is secured to said piston 3. In addition to the eccentric 2 movement, the piston 3 is driven by a stationary pinion 24 on which an integral gear 25, rigidly affixed to the piston 3 rolls at a fixed transmission ratio.

Thus, the piston 3 is rotated in the working bore 5 of the machine casing 6 by the action of the eccentric 2 and gears 24 and 25.

As shown in FIG. 2, which is a section taken along line A–B of FIG. 1, the bearing 4 is provided with three friction or guiding surfaces, 102a, 102b and 102c, corresponding to the three working surfaces 7, 8, and 9 of the rotary piston 3. Rotary piston 3 operates in the bore 5 of the machine casing 6, with its working surfaces 7, 8 and 9 being guided therein by the contour of said bore 5. For purposes of illustration only, the bore 5 shown in FIG. 2 has a trochoidal shaped contour, but as exemplified by FIGS. 3 and 4, other suitable bore shapes can be used in conjunction with appropriately shaped rotary pistons 3′ and 3″.

In FIG. 2, the piston 3 is shown in the position it assumes at the end of the compression stroke. By reason of the compressive force acting on the top piston surface 7, the piston 3 is formed against the eccentric 2, in a direction contrary to that of its stroke, as indicated by the arrow 10. The piston surfaces 8 and 9 assume this position in succession as the shaft 1 is rotated in the direction of the arrow 10.

To provide a quieter journalling of the piston 3 and eccentric 2, the bearing 4 is constructed differently from the conventional bearing (not shown) which has a single, circular cylindrical guiding surface, the diameter of which is slightly greater than the diameter of the journal member so as to provide a clearance which results in a suitable lubricant wedge between the guiding surface and said journal member.

The improvement according to the invention is accomplished by constructing the bearing 4 so that it has a plurality of guiding surfaces 102a, 102b, 102c equal in number to the working surfaces 7, 8 and 9 of the piston 3. The guiding surfaces 102a, 102b and 102c are cylindrical arc sections which adjoin each other to form a continuous interior guiding surface in the bearing 4. As can be seen from FIG. 2, each of the guiding surfaces 102a, 102b and 102c are tangent to an imaginary circular cylindrical surface surrounding the eccentric 2, and provide lubricant wedges 103a, 103b and 103c respectively.

As can be seen from FIGS. 3 and 4, the invention is not limited to rotary pistons which have non-tangential intersecting working surfaces as in the case of the piston 3 of FIG. 2, but is applicable to rotary pistons 3′ and 3″ which have tangentially joined working surfaces, as well as to other shapes of bores 5′ and 5″.

In FIG. 3, the piston 3′ is provided with two working surfaces 13 and 14, symmetrically arranged and tangentially joined so as to result in the piston 3′ having a smooth working surface contour. The piston 3″ of FIG. 4 is similar in working surface contour to that of FIG. 3, said piston 3″ having tangentially joined working surfaces 15 and 16.

The application of the improved bearing 4 according to the invention is not limited to the journalling of eccentrics 2, but can be used for journalling the shafts, as for example the shafts 1′ and 1″ in FIGS. 3 and 4, to the respective pistons 3′ and 3″.

As in the case of the bearing 4 of FIG. 2, the bearings 4′ and 4″ of FIGS. 3 and 4 respectively, are constructed so as to each have two guiding surfaces 104a, 104a′ and 104b, 104b′ respectively, corresponding to the working surfaces 13 and 14 on the piston 3′, and the working surfaces 15 and 16 on the piston 3″. In FIG. 3, the guiding surfaces 104a and 104a′ are adjoining cylindrical arc sections (not necessarily circular) which form a continuous interior surface in the bearing 4a, said surfaces 104a and 104a′ being tangential to an imaginary circular cylindrical surface surrounding the shaft 1′. As desired, the guide surfaces 104a and 104a′ can be joined either tangentially or non-tangentially.

The bearing 4″ of FIG. 4, and its guiding surfaces 104b, 104b′, are constructed similarly to the bearing 4′ of FIG. 3, but with the bearing 4″ being composed of separable shell sections 20 and 21 each corresponding to a separate guiding surface 104b, 104b′.

FIGURES 5, 6 and 7 show in detail the geometry of bearings 4 according to the invention used for the mounting of rotary pistons on their associated journal members Z, which may be either shafts 1′, 1″ or eccentrics 2. In order clearly to show the details, the wedge-shaped lubricating gaps 106 required between the journals Z and the piston bearings 4 are shown greatly exaggerated. The journal Z radius is uniformly designated in all three figures as $r_Z$, while the radii of the individual bearing 4 guide surfaces 107 are designated as $R_L$. To provide a lubricating wedge, it is necessary that the radius $R_L$ of the guide surfaces 107 be always greater than the journal Z radius $r_Z$. In this design of the mounting of the rotary piston on an eccentric journal Z, it has proven to be especially expedient for radius $R_L$ to be approximately 0.03% to 0.5% larger than journal Z radius $r_Z$. In this design it is possible greatly to reduce the bearing clearance in proportion to a normal cylindrical friction bearing, and even to reduce it to zero bearing clearance. It is even possible to provide for a press fit of an eccentric journal Z in the rotary piston bore 36 where the bearing 4 is provided with a plurality of guide surfaces 107. It has proven to be especially advantageous for the distance $e$ between the center axes $M_L$ of the radii $R_L$ of the bearing guide surfaces 107 and the center axis M of the bearing bore 36 to be made equal to 0.4 $(R_L - r_Z)$ to 1.8 $(R_L - r_Z)$.

For rotary piston machines in which the journal Z turns in only one direction, it is furthermore of special advantage for the center axes $M_L$ of the radii of the individual guide surfaces 107 of a bearing 4 to be located to one side of the extended center line connecting the center of the peripheral length of these individual guide surfaces 107 to the center axis M of the bearing bore 36, in the direction of rotation of the journal Z in the bearing 4.

FIG. 6 shows such a bearing 4 segmentally constructed and having three guide surfaces 107, and FIG. 7 shows a corresponding bearing with two guide surfaces 107. For example, in FIG. 6 the center axis $M_L$ of the radius $R_L$ of the guide surface 107 of bearing shell segment 29 is, in the direction of rotation of the journal Z corresponding to the arrow 26, offset from the extension of the center line 28 connecting the center of the peripheral length of shell 29 to the center axis M of the bearing 4. The displacement of the center axis $M_L$ from the extension of the center line 28 is characterized by the angle $\beta$, which forms the line $M_L$–M connecting to the extension of the center line 28 (see also FIG. 7). The angle $\beta$ is preferably made equal to $1/3$ to $1/20$, and preferably to $1/8$ to $1/15$ of the entire segment angle of the individual guide surface 107.

In FIG. 7, the axis $M_L$ of the radius $R_L$ of the lower bearing shell segment 30, which is located above the center axis M, is offset. Here again, the center axis $M_L$ is offset in the direction of the movement of journal Z in the direction of arrow 27, away from the extension 32 of the center line 31 which connects the center of the peripheral length of bearing shell 30 to the center axis M of the bearing 4.

In the manufacture of such bearings 4 with a plurality of guide surfaces 107 in a single bearing bore 36, it has proven to be especially economical to make these bearings 4 of a plurality of bearing shells 29, 30 corresponding to the number of bearing guide surfaces 107. These bearing shells 29, 30 are made individually to the precise wall thickness and peripheral length of their segmental section, with close tolerances. These bearing shells 29, 30 can then be assembled to form a full bearing circumference and forced into the bearing bore 36 of the appropriate part of the casing 6, piston 3 or the like. Bearings of this kind are illustrated in FIGS. 6 and 7.

To prevent the bearings 4 from being overloaded in the case of a not entirely precise alignment of the bearing bores 36 with one another, it is sometimes necessary to see to it that the back of the bearing 4 does not contact the bore 36 on its full width, but to provide for a relief cut on the margins over the entire periphery of the bearing 4 or to make provision, by means of a relief cut on the back of the bearing 4, so that the bearings 4 can yield elastically outward at the edges in case of overloading at these points.

This construction is illustrated in FIG. 8. At the bottom end of the bearing shell 33, the relief cut 34 on the back of the bearing allows the bearing to yield elastically outward at this end. A similar provision for elastic yielding is created by a counterbore 35 in the bearing bore 36. This recessing of the bearing seat surface at the edges, which is favorable to the running of the bearing, can also be put to advantageous use as a means of centering when the number of bearing shells 33 required for a complete bearing 4 are installed all together. Since the relief cut 34 makes the outside diameter at the bottom end of the bearing shells 33 smaller than the inside diameter of the bearing bore 36 at the top, the shells 33 can easily be centered and composed into a complete bearing 4. When the bearing 4 is so constructed, it is easy to press the shells 33 down into their seat in the central portion of the bearing seat bore 36 by means of a simple mandrel.

The journalling of the piston 3 according to the invention suffices in most cases for reliable performance and for long life of the sealing elements and of the driving gears 24, 25. A further improvement in the operation of the machine and quiet running can be achieved if the journal of the eccentric shaft in the casing is carried in bearings whose center axes do not coincide with the center axis of the bore of the working cylinder, but are offset in relation to this axis in the direction of the compression chamber. By this offset, the clearance of the working piston in the working bore and the bearing play in the casing bearings can be equalized, so that the mounting of the moving parts becomes more precise and can be made equivalent, if desired, to clearance-free guidance.

Such a design is represented in FIGS. 9 and 10. Here the rotary piston machine is a moving vane pump. On the shaft 37 there is fastened a rotary piston 38 which bears the sealing elements 39. When the shaft 37 rotates, the sealing elements 39 work in the working bore 40 of the machine casing 41. The pumping of liquid (not shown) produces pressures on the rotary piston 38 which attempt to push the piston 38 and its axis $M_K$ in the direction of the axis $M_B$. In the rotary piston machines which have been used hitherto, such a movement is made possible by the play of piston 39 in the working bore 40 and the play of shaft 37 in the casing bearings 42 and 43.

In the design according to the invention, in which the axis $M_G$ of the casing bearings 42, 43 of the driving shaft 37 is offset by the amount $a$ from the center axis $M_B$ of the working bore 40, in the direction of the compression chamber, and is equal in magnitude to the sum of the guidance and bearing clearances, the movement of the piston in the direction of the axis $M_B$ and further being restricted or entirely prevented.

A like improvement in the journalling of the moving parts is achieved if a construction similar to FIG. 7 is used also for the casing bearings 42 and 43, with each bearing being divided into two guide surfaces 107. As described above, in this construction the bearing clearances can be much less than in a normal cylindrical bearing and, if desired, can be completely eliminated or even can be transformed into a positive guidance with pressure between bearing surfaces and journal elements. As FIG. 7 shows, the bearings 42 and 43 of FIG. 9 can be composed of a plurality of bearing shells 30 which have been assembled in the manner previously described to form complete bearings 42 and 43.

Accordingly, the same method of the axial displacement $a$ of the casing bearings 42 and 43 from the axis of the working bore 40 of the rotary piston 38 is applicable to the structure shown in FIGS. 1 and 2. Here again, the center axis of the trochoidal (for example) working bore 5 is designated as $M_B$, and, as in FIG. 9, the axes $M_G$ of the casing bearings carrying the eccentric shaft 1 are displaced by the amount $a$ from the center axis $M_B$ of the working bore 5, in the direction of the compression chamber.

The invention is also applicable to bearings 4, 42, or 43 which are designed as rolling bearings, and to such bearings, 4, 42, or 43 having individual guide surfaces 107 which are constructed, not as arcs of a circle with a constant radius $R_L$ over their entire periphery, but from arc-like curves, such as elliptical, hyperbolic or parabolic sections.

It is to be noted that the bearing constructions described herein by way of example are not limited in application to rotary pistons; but may be used with cams having analogous loading characteristics as well.

In order to remove foreign bodies which are carried by lubricant circulation into the highly loaded areas of a bearing 4, 42 or 43, it has been found to be necessary to provide lubricating pockets recessed into the guide surfaces 107. Foreign body removal is aided by constructing such pockets with boundaries that cause the lubricating oil which enters upon the guide surface 107 to flow in a direction which is inclined at an acute angle to the mantle line of the bearing 4, 42, or 43 and slants towards one or both of the marginal edges of the bearing 4, 42 or 43.

Such lubricating pockets are shown in the developed bearing surface in FIG. 11. In this example, a plurality of bearing shells 45, 47 and 48, assembled to form a full bearing 4''', are represented in development with 45 designating the middle bearing shell. The journal (not shown) carried in this bearing 4''' moves over the bearing surface in the direction of the arrow 46. 47 and 48 represent bearing shells adjacent to shell 45. The lubricating pocket 49 has a boundary edge 50 which is inclined at an acute angle to the mantle lines of the bearing 4'''. In this manner, foreign bodies, which enter the bearing 4''' through the lubricant feed hole 51, for example, are deflected to the bearing edge 52 and pass out of the bearing guide surface 107 before they enter into the principal load carrying area of the bearing 4'''. In the lubricating pocket 53 of shell 48, the oil entry margin slants towards both ends 52 and 54 of the bearing 4''' at an acute angle to the mantle lines. Here the dirt particles occurring in the oil circulation are deflected by this shape of the lubricating pocket 53 toward the two ends, 52 and 54, so that the bearing guide surface 107 is not worn by the dirt particles. Lubricating grooves 55 cooperating with these dirt deflecting lubricating pockets 49 and 53 have also proven valuable, these grooves 55 being located ahead of the lubricating pockets 49 and 53 in the direction of rotation of the journal, in the negative-pressure area insofar as possible, and in the re-expanding oil gap. Due to the negative pressure occurring here, lubricating oil is sucked from the lubricating pockets, which are expediently located in the center of the bearing 4''', and is distributed over the bearing guide surface 107, thus diminishing or completely preventing the infiltration of air from the bearing ends 52 and 54 which would otherwise occur in the negative-pressure area of the bearing 4'''.

In the case of the bearings of the invention, the dirt-deflecting lubricant pockets 49 and 53 are placed as they are in FIG. 11, that is, always at the forward edges of the bearing shells 45 and 48, while the oil grooves 55 are disposed in the negative-pressure area, i.e., at the rear edges of the shells, 47 and 45, looking in the direction of rotating of the journal carried in the bearing 4'''.

FIG. 12, which is a cross-sectional view of the bearing shell 45 in FIG. 11, taken along the line G–H therein, illustrates a typical cross-sectional shape for the oil grooves 55.

FIG. 13, which is a cross-sectional view of the bearing shell 48 in FIG. 11, taken along the line I–K, illustrates a typical cross-sectional contour for the lubricating pocket 53. To facilitate the removal of foreign matter from the central area of the shell 48, the lubricating pocket 53 is recessed into the shell 48 so as to have a depth which gradually increases from a minimum at said central area to a maximum at each of its boundaries adjacent to the edges 52 and 54 of said shell 48.

If desired, dirt removal passages in the form of grooves 64 or holes 65 can be provided at the corners of the lubricating pockets 49 and 53 for removal of foreign bodies, or dirt collected therein. The breadth of the dirt deflecting lubricating pockets 49 and 53 can be made 45 to 85 percent, and preferably 65 to 80 percent of the bearing 4''' width, and the length of said pockets 49 and 53 can be made from $\frac{1}{24}$ to $\frac{1}{6}$, and preferably from $\frac{1}{18}$ to $\frac{1}{8}$ of the segment length.

The lubricating grooves 55 can be made with a breadth ranging from 5 to 30 percent, and preferably 10 to 20 percent of the bearing 4''' width, and with a length ranging from $\frac{1}{3}$ to $\frac{1}{15}$ and preferably $\frac{1}{5}$ to $\frac{1}{10}$ of the segment length.

In the case of rotary piston machines, the rotary piston as a rule is cooled by the lubricant oil. In that case, the cooling oil then passes over the eccentric bearing through holes and grooves in the eccentric journal and in the bearing, into the piston, and back out of the piston through openings which often contain a restriction, into the machine casing. The lubricating and cooling oil is usually fed to the bearings and piston through the hollow eccentric shaft. To prevent lubricant that enters axially into the eccentric shaft from one side from being wholly or largely lost through the lubricating oil holes over the eccentric bearing so that the casing bearing at the other end receives no lubricant, the restrictions at the outlet of the piston must be so dimensioned that not all of the output of the oil pump can run over the piston as cooling oil, but some is left to lubricate the casing bearing located at the end of the lubricant circuit. According to the invention it has in this case proven extremely advantageous to dispose the cooling oil outlet holes in the central bore of the eccentric shaft in such a manner that the oil entry into these holes is on a smaller radius than the passages for taking out the lubricating oil for the casing bearings. By this measure it is brought about that first the two casing bearings at the ends of the eccentric shaft are provided with lubricating oil from the central bore in the eccentric shaft, and then all of the rest can flow through the radial holes in the eccentric to the piston to serve as lubricant and cooling oil. In this manner, the entire output of the oil pump is dependably divided for lubrication and cooling.

In FIG. 14 such an embodiment is represented. The eccentric shaft 56 with the central lubricating oil bore 57 has radial oil outlet holes 58 and 59 for the lubrication of the casing bearings (not shown). The oil outlet openings 60 and 61 on the eccentric are equipped in this embodiment, which is given by way of example, with tubes 62 and 63 which project into the center bore 57 of the eccentric shaft 56, so that the oil entry into the tubes 62 and 63 is at a lesser radial position than the oil entry into the holes 58 and 59 which serve the casing bearings for the eccentric shaft 56.

One of the advantages offered by the segmented bearing construction according to the invention, and illustrated by FIGS. 6, 7, 8 and 11, is that a complete annular bearing can be assembled by placing the segments together in the seating bore of a casing using a press fit on the order of 0.5 to 6 percent. In such cases, the individual shell segment lengths before installation in the casing may have outside diameters ranging up to 4 per cent larger than that which corresponds to their peripheral length in the seating bore, which can be provided at the bearing entrance end with a cylindrical recess 35 as in FIG. 8 having a diameter about 2 to 3 percent larger than the seat bore diameter.

If desired, the equivalent of this recess can be provided in a special centering ring (not shown) which is placed on the bearing concentrically with the seat bore. Alternatively, the insertion end of the bearing may be undercut as at 34 in FIG. 8 to facilitate insertion.

The recess 35 can be made with a width ranging from $\frac{1}{2}$ to $\frac{1}{4}$, and preferably $\frac{1}{8}$ to $\frac{1}{5}$ of the bearing shell width, and the undercut 34 can be made with a width ranging from $\frac{1}{12}$ to $\frac{1}{4}$, and preferably $\frac{1}{8}$ to $\frac{1}{5}$ of the bearing shell width, having an outside diameter which is smaller by about 2 to 3 percent.

What is claimed is:

1. A bearing for journalling a rotatable cylindrical member to a rotary piston having a plurality of curved peripheral working surfaces and a bearing bore, which comprises a bearing shell fixedly disposed within said bore, said bearing shell having a plurality of end-adjacent, arcuate, interior guiding surfaces, the number of which equals the number of piston working surfaces, said arcuate surfaces cooperating to guide and journal said rotatable member to said piston, said arcuate guiding surfaces having radii of curvature which provide a clearance wedge between said surfaces and the journalled member, and means for introducing a lubricant into said clearance wedge.

2. The bearing of claim 1 wherein the arcuate guiding surfaces are circular cylindrical surfaces of an associated cylindrical segment, each surface having an associated center axis, said surfaces being disposed so that the center axis of each surface lies within the volume of the cylindrical segment associated with the succeeding adjoining surface in the direction of journal member rotation, and said center axes are mutually parallel.

3. In a rotary piston machine having a casing with a working bore, rotatable drive shaft, and a rotary piston mounted to said drive shaft and guided in said working bore, the improvement which comprises a plurality of bearings journalled to said drive shaft, each of said bearings being fixedly mounted with respect to the casing and having a plurality of interior arcuate guiding surfaces which surround said drive shaft and cooperate to guide its rotary motion, said bearings being disposed with their center axes offset by a fixed distance from the center axis of the casing bore, so that the guide surface radii of said bearings overlap one another, said overlap being in the direction of compression in the casing bore, with the amount of said overlap being substantially equal to the sum of the individual bearing-to-shaft clearances and the piston-to-bore guidance clearance.

4. The bearing of claim 2 wherein the guiding surfaces of the bearing have the same radii of curvature and are disposed so that their center axes are located at a common fixed distance $e$ from the center axis of the bearing bore, said distance $e$ being established by the formula:

$$e = K(R_L - r_Z)$$

wherein:

K is a constant within the range 0.4 to 1.8; and $R_L$ is the radius of curvature of the guide surfaces; and $r_Z$ is the radius of the journal member, with $R_L$ being approximately 0.3 to 0.5 percent greater than $r_Z$.

5. The bearing of claim 4 wherein said bearing has a circular cylindrical exterior surface in fixed abutting contact with the bearing bore, and the guiding surfaces are disposed so that the center axis of each guiding surface lies in a plane which passes through the center axis of the bearing bore and forms a fixed acute angle with another plane which passes through said bore axis and bisects the arc segments of the bearing exterior surface which is adjacent to said guiding surface, said acute angle having a value ranging from one-third to one-twentieth of the angle subtended by said arc segment.

6. The bearing of claim 5 wherein the acute angle has a value within the range one-sixth to one-fifteenth of the angle subtended by said arc segment.

7. The bearing of claim 1 wherein the bearing shell comprises a plurality of separable shell segments, each segment corresponding to a single guiding surface, said shell segments being fixedly disposed in adjoining abutting end contact to form a composite annual bearing shell.

8. The bearing of claim 7 wherein at least one lubricating pocket, recessed into a guiding surface is provided, said lubricating pocket having a closed boundary with a plurality of corners for the collection of foreign bodies in a lubricant introduced into said pocket with a portion of said pocket boundary extending partially across the bearing width and inclined towards at least one of the end edges of said bearing at an acute angle to the mantle line of the corresponding shell segment, with means being provided for introducing a lubricant into said pocket.

9. The bearing of claim 8 wherein:
(a) Passages communicating with the foreign body collecting corners in said lubricating pocket are provided for the removal of said foreign bodies therefrom; and,
(b) The breadth of said lubricating pocket is equal to 45 to 85 percent of the bearing width; and,
(c) The length of said lubricating pocket is equal to one-twenty-fourth to one-sixth of the bearing segment length.

10. The bearing of claim 9 wherein each lubricating pocket is provided with an adjoining lubricating groove in communication therewith, said lubricating groove being disposed so as to lie in the area of the re-expanding lubricant gap in the bearing, for refilling said gap with lubricant, said groove having a breadth of 5 to 30 percent of the bearing width and a length of one-third to one-fifteenth of the bearing segment length.

11. The bearing of claim 7 wherein the bearing shell has a cylindrical exterior surface which is undercut along one edge to form an annular region thereat of reduced diameter to facilitate insertion into a bearing bore.

12. In combination, a rotatable cam-shaped member having a cylindrical bearing bore which is counterbored to an increased diameter at one end, and an annular bearing shell having an exterior cylindrical surface which is undercut along one edge to form an annular region thereat of reduced diameter with said bearing shell being inserted into said bore so that the reduced diameter portion of the shell lies beyond the counterbored portion of the bearing bore.

13. In a rotary piston machine having a rotatable drive shaft, an eccentric mounted to said drive shaft, a rotary piston journalled to said eccentric, and a plurality of bearings journaled to said drive shaft, the improvement which comprises a hollow central lubricant feed passage extending through said drive shaft, a plurality of lubricant passages radially disposed in said drive shaft communicating with said central lubricant feed passage therein, and with each of said shaft bearings, and a hollow lubricant tube disposed within said eccentric, said lubricating tube having an outlet end which communicates with the exterior of said eccentric to supply lubricant thereat to the piston journaled thereto, and an inlet end which extends partially into the central lubricant feed passage of the drive shaft, whereby the inlet end of said lubricating tube is located at a lesser radius than the inlet ends of the lubricant passages for the drive shaft bearings.

14. A bearing assembly which comprises a plurality of annular bearing shell segments and a casing having a cylindrical bearing seat bore, said seat bore having a bearing shell entrance end which is provided with a concentric cylindrical recess having a diameter which is 2 to 3 percent larger than the diameter of said seat bore and a width of approximately one-fourth to one-twelfth of said bearing shell width, said shell segments having outside peripheral lengths not greater than 4% long than their corresponding seat bore peripheral lengths, said shell segments being inserted in contigous end abutting contact into said seat bore with a press fit of approximately 0.5 to 6 percent to form a continuous annular bearing shell.

References Cited by the Examiner

UNITED STATES PATENTS

| | | | |
|---|---|---|---|
| 1,673,259 | 6/1928 | Meston et al. | 103—126 |
| 2,864,315 | 12/1958 | Udale | 103—126 |
| 2,870,719 | 1/1959 | Murray et al. | 103—126 |
| 2,870,720 | 1/1959 | Lorenz | 103—126 |
| 2,891,483 | 6/1959 | Murray et al. | 103—126 |
| 2,898,863 | 8/1959 | Wotring et al. | 103—126 |
| 3,011,838 | 12/1961 | Love | 308—122 |
| 3,070,406 | 12/1962 | McKenney | 308—9 |
| 3,172,304 | 3/1965 | Robertson | 308—122 |

FOREIGN PATENTS

| | | |
|---|---|---|
| 1,046,637 | 12/1958 | Germany. |
| 943,693 | 12/1963 | Great Britain. |

MARK NEWMAN, *Primary Examiner.*

W. J. GOODLIN, *Assistant Examiner.*